(No Model.)
C. MARTIN.
MATCH TRAY.
No. 349,112. Patented Sept. 14, 1886.
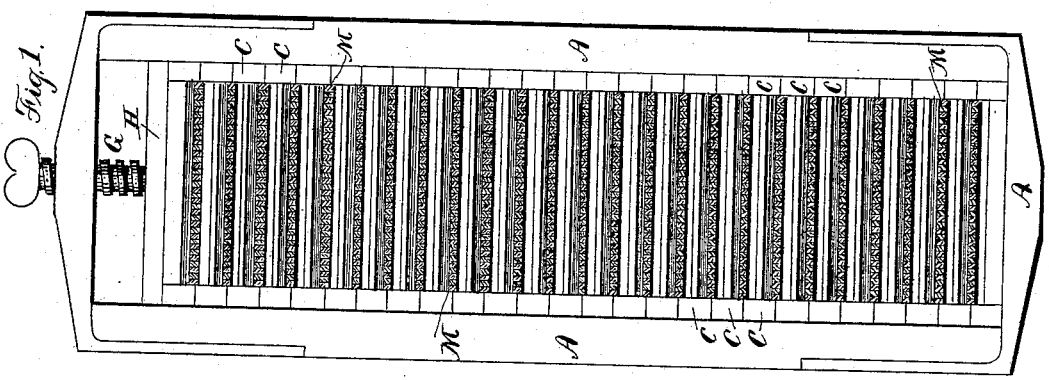
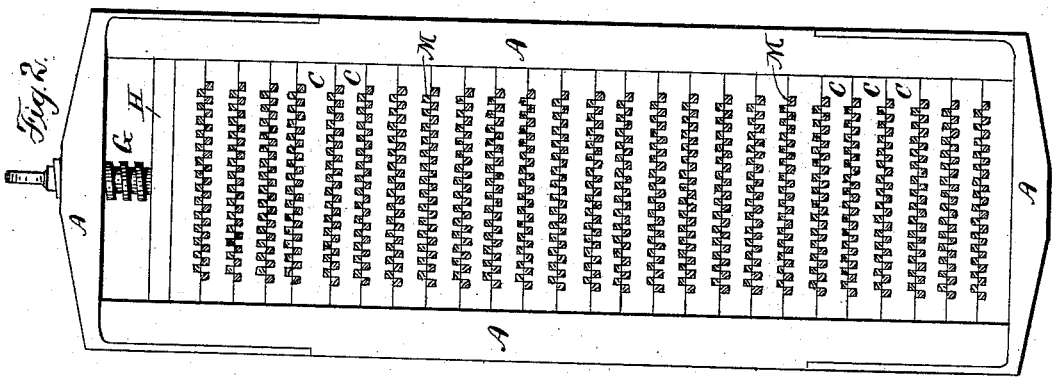
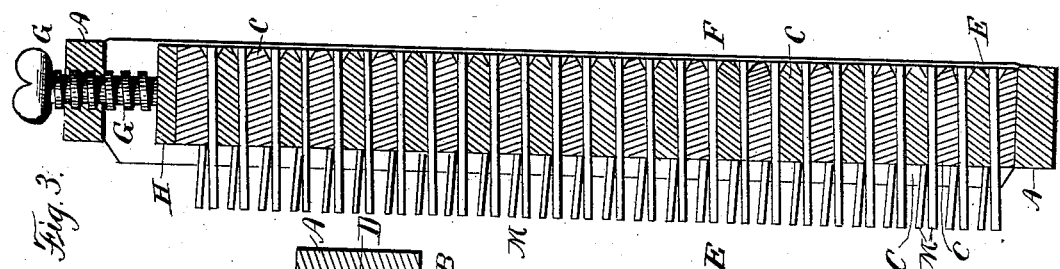
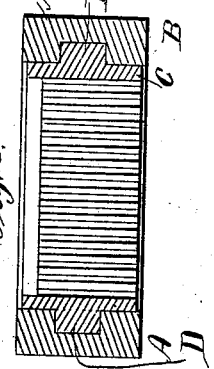
Witnesses.
C. W. H. Brown
M. L. Williams,
Inventor.
Charles Martin.
By W. A. Bartlett
atty

UNITED STATES PATENT OFFICE.

CHARLES MARTIN, OF TORONTO, ONTARIO, CANADA.

MATCH-TRAY.

SPECIFICATION forming part of Letters Patent No. 349,112, dated September 14, 1886.

Application filed May 6, 1886. Serial No. 201,323. (No model.)

*To all whom it may concern:*

Be it known that I, CHARLES MARTIN, residing at Toronto, in the county of York, Province of Ontario, Canada, have invented certain new and useful Improvements in Match-Trays, of which the following is a specification, reference being had therein to the accompanying drawings.

This invention relates to match trays or frames of the character which receive the splints from the match-splint machine and afford a means of retaining the splints spaced or separated from each other in condition for dipping.

The object of the invention is to produce a tray which shall automatically space, separate, or spread the successive rows of matches as they come from the splint-cutting machine, and which shall hold them in readiness for dipping.

In the drawings, Figure 1 is a plan of the face of the tray or rack. Fig. 2 is a plan of the back of the same. Fig. 3 is a vertical longitudinal section of same. Fig. 4 is a cross-section of same, and Fig. 5 is an enlarged broken portion of Fig. 3.

A indicates the frame of the tray or rack, which is a rectangular open frame, of wood or metal, sufficiently strong to retain the inclosed portions. The side bars, A' A', are grooved, as at B, so as to receive the ends of the match-retaining slats. A number of slats or bars, C, having tenons D at each end, extend across the frame A, the tenons D resting in the grooves B in the frame. The slats C have in their proximate faces a number of grooves, E. The grooves E are at the edge of the slat next the face or entry side of the match of a depth equal to half the thickness of a match-splint. On the opposite side of the slats alternate grooves come to a flush surface, while the other alternates are made deeper to a depth equal to the thickness of a match-splint. Thus the grooves for the splints on the back or exit side of the tray appear to be alternately in one or the other slat, while on the entry side the grooves are partly in each slat. A beveled or inclined surface, F, is made on each slat at the place of entrance of the match-splints, (see Figs. 3 and 5,) by which the row of splints as they come from the machine are guided to their respective grooves. The entire series of slats C is held in frame A by screw G passing through a nut in one end of the frame and bearing on follower H; or a wedge or equivalent device may be substituted for the screw. By this means the slats in the frame may be pressed tightly together.

In another application I have described a machine for cutting matches in rows from a block, and for conveying them to a tray or rack of the general character above described; but it will be understood that this rack may be used with any splint-making machine which produces match-splints in rows. The side of the tray or rack shown in Fig. 1 is presented toward the machine, and the slats C are preferably horizontal. Then as a row of matches, as M, from the machine is thrust between the bars C alternate matches will be guided up or down, as in Fig. 2, until the ends of the matches on the opposite side of the tray will be spaced, as in Fig. 3. By raising or lowering the tray a little way the aperture is presented for the next row of matches between the next succeeding slats, which have been held loosely in the grooves in the frame. When all the match-grooves have been filled, the slats are bound tightly on them, as by screw G, and the tray may then be held in inverted position over the dipping-trough.

It will be understood that the construction of the frame A forms no very material part of this invention, the broad idea being a tray in which the matches entering in a position parallel with each other are diverted into different planes, so that their ends which require dipping are spaced apart.

I claim—

1. A match tray or rack composed, essentially, of strips having grooves starting from a common plane and alternately diverging in different directions.

2. A match tray or rack composed, essentially, of strips having grooves across their proximate faces, the grooves being partially in each slat at the entrance end and alternately increasing or decreasing in depth, substantially as described.

3. A match tray or rack composed of slats having grooves in their faces alternately increasing and decreasing in depth, in combination with an inclosing-frame and mechanism, substantially as described, whereby the slats may be lightened in the frame, as set forth.

4. In combination with the supporting-frame, the slats having beveled edges at the entrance side and grooves alternately diverging in opposite directions, substantially as described.

5. The inclosing-frame having grooves in its sides, the slats having tenons to enter said grooves, said slats having recesses in their proximate faces alternately trending in different directions, and a clamp by which all the slats are compacted and pressed on inclosed matches, substantially as described.

In testimony whereof I affix my signature in presence of two witnesses.

CHARLES MARTIN.

Witnesses:
L. N. MARTIN,
E. J. LEADLAY.